(12) United States Patent
Mohammadzadeh et al.

(10) Patent No.: US 10,372,353 B2
(45) Date of Patent: Aug. 6, 2019

(54) APPARATUSES AND METHODS TO CONTROL MEMORY OPERATIONS ON BUFFERS

(71) Applicant: Micron Technology, Inc., Boise, ID (US)

(72) Inventors: Ali Mohammadzadeh, Mountain View, CA (US); Jung Sheng Hoei, Newark, CA (US); Dheeraj Srinivasan, San Jose, CA (US); Terry M. Grunzke, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 99 days.

(21) Appl. No.: 15/609,569

(22) Filed: May 31, 2017

(65) Prior Publication Data

US 2018/0349029 A1    Dec. 6, 2018

(51) Int. Cl.
*G06F 12/00* (2006.01)
*G06F 13/00* (2006.01)
*G06F 3/06* (2006.01)
*G06F 12/0811* (2016.01)

(52) U.S. Cl.
CPC .......... *G06F 3/0619* (2013.01); *G06F 3/0616* (2013.01); *G06F 3/0656* (2013.01); *G06F 3/0659* (2013.01); *G06F 3/0679* (2013.01); *G06F 12/0811* (2013.01); *G06F 2212/283* (2013.01)

(58) Field of Classification Search
CPC combination set(s) only.
See application file for complete search history.

(56) References Cited

U.S. PATENT DOCUMENTS

| 5,276,848 | A | * | 1/1994 | Gallagher | ........... G06F 12/0897 711/121 |
| 5,539,895 | A | * | 7/1996 | Bishop | .................... G06F 12/08 711/117 |
| 5,584,039 | A | * | 12/1996 | Johnson | ................ G06F 13/126 710/1 |
| 7,808,838 | B2 | | 10/2010 | Kim et al. | |
| 8,111,549 | B2 | | 2/2012 | Yip | |
| 8,719,508 | B2 | * | 5/2014 | Comparan | .......... G06F 12/0817 711/100 |

(Continued)

FOREIGN PATENT DOCUMENTS

WO    2009067522    5/2009

OTHER PUBLICATIONS

International Search Report and Written Opinion for related PCT Application No. PCT/US2018/035100, dated Dec. 26, 2018, 14 pages.

*Primary Examiner* — Sean D Rossiter
(74) *Attorney, Agent, or Firm* — Brooks, Cameron & Huebsch, PLLC

(57) ABSTRACT

The present disclosure relates to apparatuses and methods to control memory operations on buffers. An example apparatus includes a memory device and a host. The memory device includes a buffer and an array of memory cells, and the buffer includes a plurality of caches. The host includes a system controller, and the system controller is configured to control performance of a memory operation on data in the buffer. The memory operation is associated with data movement among the plurality of caches.

23 Claims, 6 Drawing Sheets

(56) References Cited

U.S. PATENT DOCUMENTS

| | | | |
|---|---|---|---|
| 9,075,772 B2* | 7/2015 | Kawada | G06F 11/1456 |
| 9,311,239 B2* | 4/2016 | Conray | G06F 12/10 |
| 10,102,129 B2* | 10/2018 | Vinod | G06F 12/0811 |
| 2009/0172260 A1 | 7/2009 | Olbrich et al. | |
| 2009/0228670 A1* | 9/2009 | Nakagawa | G06F 11/1464 |
| | | | 711/162 |
| 2013/0173861 A1* | 7/2013 | Comparan | G06F 12/0817 |
| | | | 711/122 |
| 2016/0026406 A1 | 1/2016 | Hahn et al. | |
| 2017/0031601 A1 | 2/2017 | Arai et al. | |
| 2017/0083235 A1 | 3/2017 | Chen et al. | |
| 2017/0177483 A1* | 6/2017 | Vinod | G06F 12/0811 |

\* cited by examiner

SYSTEM CONTROLLER SET FEATURES

| FEATURES | OPTIONS | DQ0 | DQ1 | DQ2 | DQ3 | DQ4 | DQ5 | DQ6 | DQ7 |
|---|---|---|---|---|---|---|---|---|---|
| P1 | | | | | | | | | |
| PAGE BUFFER OPERATION | COPY | | | | | | | 0 | 0 |
| | RESET | | | | | | | 0 | 1 |
| | SWAP | | | | | | | 1 | 0 |
| RESERVED | --- | --- | --- | --- | --- | --- | --- | | |
| P2 | | | | | | | | | |
| PLANE SELECTION | PLANE 0 | 0 | 0 | 0 | 0 | 0 | 0 | 0 | 1 |
| | PLANE 0 & 1 | 0 | 0 | 0 | 0 | 0 | 0 | 1 | 1 |
| | ALL PLANES | 0 | 0 | 0 | 0 | 1 | 1 | 1 | 1 |
| P3 | | | | | | | | | |
| BUFFER SELECTION | SDC | 0 | 0 | 0 | 0 | 0 | 0 | 0 | 1 |
| | PDC 0 | 0 | 0 | 0 | 0 | 0 | 0 | 1 | 0 |
| | PDC 1 | 0 | 0 | 0 | 0 | 0 | 1 | 0 | 0 |
| | PDC 2 | 0 | 0 | 0 | 0 | 1 | 0 | 0 | 0 |
| | PDC 3 | 0 | 0 | 0 | 1 | 0 | 0 | 0 | 0 |
| P3 | | | | | | | | | |
| BUFFER SELECTION | SDC, PDC 1, PDC 3 | 0 | 0 | 0 | 1 | 0 | 1 | 0 | 1 |
| | PDC 2, PDC 3 | 0 | 0 | 0 | 1 | 1 | 0 | 0 | 0 |

*Fig. 5*

APPARATUSES AND METHODS TO CONTROL MEMORY OPERATIONS ON BUFFERS

TECHNICAL FIELD

The present disclosure relates generally to memory devices, and more particularly, to apparatuses and methods to control memory operations on buffers.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory devices can be combined together to form a storage volume of a memory system such as a solid state drive (SSD). A solid state drive can include non-volatile memory (e.g., NAND flash memory and NOR flash memory), and/or can include volatile memory (e.g., DRAM and SRAM), among various other types of non-volatile and volatile memory.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Electronic systems often include a number of processing resources (e.g., one or more processors), which may retrieve and execute instructions and store the results of the executed instructions to a suitable location. A processor can comprise a number of functional units such as arithmetic logic unit (ALU) circuitry, floating point unit (FPU) circuitry, and a combinatorial logic block, for example, which can be used to execute instructions by performing an operation (e.g., a compute operation) on data (e.g., one or more operands). As used herein, a compute operation can be, for example, a Boolean operation, such as AND, OR, NOT, NOT, NAND, NOR, and XOR, and/or other operations (e.g., invert, shift, arithmetic, statistics, among many other possible operations) that may involve manipulating data. For example, functional unit circuitry may be used to perform the arithmetic operations, such as addition, subtraction, multiplication, and division on operands, via a number of logical operations. A compute operation such as described above can be distinguished from a "memory operation," which, as used herein, can refer to an operation that does not involve data manipulation (e.g., via a functional unit often associated with a processing resource). Examples of memory operations include data read, data write, and data refresh operations.

Data received at the memory device from the host may be temporarily stored in a buffer. For example, the host may send data to the memory device, and the buffer may store a portion of the data while programming another portion of the data to the memory device. As such, the host need not wait to send another data to the memory device until completion of programming the data to the memory device. Utilization of the buffer in various ways (e.g., by the host) may be useful.

BRIEF DESCRIPTION OF THE DRAWINGS

FIG. 5 illustrates a table illustrating an example of a set features interface maintained internal to a host in accordance with a number of embodiments of the present disclosure.

DETAILED DESCRIPTION

Figure 1:
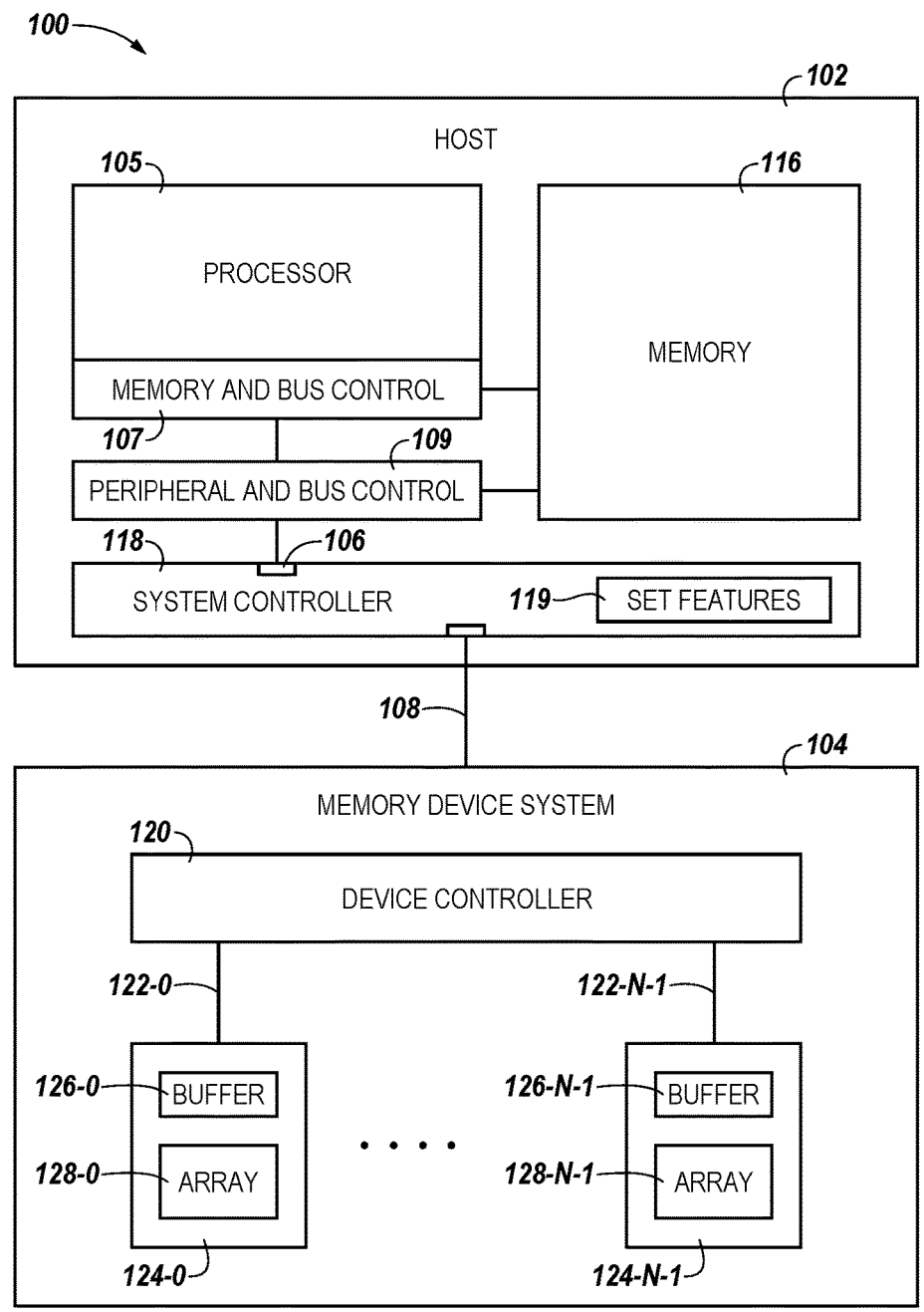
FIG. 1 is a block diagram of an apparatus in the form of a computing system for control of memory operations on buffers in accordance a number of embodiments of the present disclosure.

The present disclosure relates to apparatuses and methods to control memory operations on buffers. An example apparatus includes a memory device and a host. The memory device includes a buffer and an array of memory cells, and the buffer includes a plurality of caches. The host includes a system controller, and the system controller is configured to control performance of a memory operation on data in the buffer. The memory operation is associated with data movement among the plurality of caches.

Embodiments of the present disclosure can provide various benefits, such as providing an additional memory resource to a host. For example, a number of embodiments of the present disclosure provide a mechanism for host-initiated operations on data of an internal buffer of the memory device. Consider a host that is not able to control/track operations being performed on the internal buffer. In this approach, a plurality of caches (e.g., of the internal buffer) that each can act as, for example, static random access memory (SRAM) that is not recognized as a memory resource to the host because the internal buffer merely conveys data received from the host to an array of memory cells of the memory device. As such, the plurality of caches of the internal buffer are not used as the memory resource to the host.

In contrast, the host can, in a number of embodiments described herein, be configured to control performance of an operation (e.g., memory operation and/or compute operation) on data in the plurality of caches of the internal buffer. As such, the host may, for example, move data stored in the internal buffer to other places, and use the plurality of caches as the additional memory resource. The operations that can be initiated by the host and performed on the internal buffer can also be associated with improving reliability of the memory device, among various other benefits.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

It is to be understood that the terminology used herein is for the purpose of describing particular embodiments only, and is not intended to be limiting. As used herein, the singular forms "a", "an", and "the" can include both singular and plural referents, unless the context clearly dictates otherwise. In addition, "a number of", "at least one", and "one or more", e.g., a number of memory arrays, can refer to one or more memory arrays, whereas a "plurality of" is intended to refer to more than one of such things. Furthermore, the words "can" and "may" are used throughout this application in a permissive sense, i.e., having the potential to, being able to, not in a mandatory sense, i.e., must. The term "include," and derivations thereof, means "including, but not limited to". The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the drawing. Similar elements or components between different figures may be identified by the use of similar digits. For example, 126 may reference element "26" in FIG. 1, and a similar element may be referenced as 426 in FIG. 4. Multiple analogous elements within one figure may be referenced with a reference numeral followed by a hyphen and another number or a letter. For example, 126-0 may reference element 26-0 in FIGS. 1 and 126-1 may reference element 26-1, which can be analogous to element 26-0. Such analogous elements may be generally referenced without the hyphen and an extra numeral or letter. For example, elements 126-0 and 126-0 may be generally referenced as 205.

FIG. 1 is a block diagram of an apparatus in the form of a computing system 100 for control of memory operations on buffers in accordance a number of embodiments of the present disclosure. As used herein, a host (e.g., 102), a memory device system (e.g., 104), a host controller (e.g., system controller 118), or a memory device controller (e.g., device controller 120) also might each be separately considered an "apparatus".

Computing system 100 includes a memory device system 104 (e.g., an SSD) coupled to a host 102 through a device interface 108. As used herein, "coupled to" is intended to refer to a connection between components, which may be an indirect communicative connection or direct communicative connection (e.g., without intervening components), whether wired or wireless, including connections such as, electrical, optical, magnetic, etc. The memory device system 104 can be a solid state storage appliance implemented using a number of SSDs, for example. The computing system 100 can include a controller internal to the memory device system 104 (e.g., device controller 120), in addition to the controller internal to the host (e.g., system controller 118). The device controller 120 may be coupled to a number of memory resources in the memory device system 104 via a number of suitable memory interfaces (not shown). The memory resources may, in a number of embodiments, include a number of SSD memory resources, such as memory devices 124-0, . . . , 124-N−1, which can include volatile memory devices (e.g., DRAM, SRAM, etc.) and/or non-volatile memory devices (e.g., NAND, NOR, etc.).

Example hosts 102 can include laptop computers, personal computers, digital cameras, digital recording and playback devices, mobile telephones, PDAs (personal digital assistants), memory card readers, and interface hubs, among other host systems. A host interface 106 may include a serial advanced technology attachment (SATA), peripheral component interconnect express (PCIe), or a universal serial bus (USB), among other connectors and interfaces for interaction with host components. The host interface 106 in combination with the device interface 108 can provide an interface for passing control, address, data, and other signals between the memory device system 104 and the host 102.

Host 102 can include a number of processors 105 (e.g., parallel processors, co-processors, a central processing unit (CPU), etc.) coupled to a memory and bus control 107. The processor 105 can be a number of microprocessors, or some other type of controlling circuitry, such as a number of application-specific integrated circuits (ASICs), for example. Other components of the computing system 100 may also have processors. The memory and bus control 107 can have memory 116 and/or other components coupled thereto. In this example, memory and bus control 107 is coupled to a host memory 116, which in a number of embodiments may include volatile memory (e.g., DRAM) and/or non-volatile memory (e.g., NAND), among other types of memory. In this example, a peripheral and bus control 109 may be coupled (e.g., via the host interface 106) to the host memory 116, a flash drive (not shown) (e.g., via a universal serial bus (USB) interface), a non-volatile memory host control interface (NVMHCI) flash memory (not shown), and/or the memory device system 104 (e.g., via the system controller 118 and through the device interface 108). The memory device system 104 can be used in addition to, or in lieu of, a hard disk drive (HDD) in a number of different computing systems. The computing system 100 illustrated in FIG. 1 is one example of such a system; however, embodiments of the present disclosure are not limited to the configuration shown in FIG. 1.

As one example, the memory device system 104 can be a SSD. The memory device system 104 can include the device controller 120 (e.g., memory control circuitry, firmware, and/or software) coupled to a number of memory resources (e.g., memory devices 124-0, . . . , 124-N−1) via a bus (e.g., buses 122-0, . . . , 122-N−1). Examples of SSD memory resources are described further in connection with FIGS. 2 and 3. Examples of buses (e.g., pins) for coupling the device controller 120 to a single unit memory device 230 are shown at 232 and described in connection with FIG. 2 (e.g., as input/output (I/O) lines I/O 0, I/O 1, . . . , I/O 7, although the number of such I/O lines are not limited to 8 I/O lines). Examples of buses (e.g., pins) for coupling the device controller 120 to a multiplane memory device 340, including a plurality of planes 343, are shown at 342 and described in connection with FIG. 3 (e.g., as data (DQ) buses DQ 0, DQ 1, . . . , DQ 7, although the number of such DQ buses are not limited to 8 I/O lines). The single unit memory device 230 with the I/O lines 232 shown in FIG. 2 and the multiplane memory device 340 with the DQ buses 342 shown in FIG. 3 are presented by way of example; however, embodiments of the present disclosure are not limited to these examples.

The system controller 118 includes the host interface 106 for communication with the host 102 and a device interface 108 for communication with the memory devices 124-0, . . . , 124-N−1 via the buses 122-0, . . . , 122-N−1 (e.g., 232 and/or 342). Various buses also can send and/or receive various signals (e.g., data signals, control signals, and/or address signals, among others) between the memory device 140 and/or the device controller 120 thereof and the system controller 118.

The system controller 118 includes a set features interface 119 that is configured to issue a plurality of set feature commands to the memory devices 124. The set features interface 119 may, in some embodiments, be associated with (e.g., formed as part of) the system controller 118. Responsive to receiving set feature commands, the memory devices 124 are configured to perform a memory operation, for example, on a buffer 126. An embodiment of the set features interface 119 is shown at 519 and described in connection with FIG. 5.

The system controller 118 can be configured to control performance of a memory operation on data in a buffer 126 (e.g., 126-0, . . . , 126-N−1). An operation performed by the system controller 118 can be associated with data movement among the plurality of caches. As shown and described in connection with FIG. 4, the data movement can include, for example, moving data stored on a second cache (e.g., secondary data cache (SDC) 427) of the buffer 126 to a first cache (e.g., primary data cache (PDC) 429) of the respective buffer 126 such that the second cache of the buffer 126 is available to the external controller (e.g., system controller 118) as a memory resource.

Ordinal numbers such as first and second and/or primary and secondary are used herein to assist in correlating and/or distinguishing between similar and/or selectably coupled components (e.g., portions of data, and/or data caches, etc.) and are not used to indicate a particular ordering and/or relationship between the components, unless the context clearly dictates otherwise (e.g., by using terms such as adjacent, etc.).

As one example, the system controller 118 can be further configured to receive a request to issue a program suspend command associated with usage of a second cache (e.g., SDC 427) while data are being programmed from the buffer 126 to the array of memory cells 128 (e.g., 128-0, . . . , 128-N−1), and issue a first command such that a first portion of the data is moved from the second cache (e.g., SDC 427) to a cache of a plurality of first caches (e.g., PDC 429). The first portion of the data is an amount of bits that are not programmed to the array of memory cells 128 during the data being programmed to the array of memory cells 128. In this example, the system controller 118 can be also configured to issue a second command that is the program suspend command such that an operation associated with the program suspend command is performed on the second cache while the first portion of the data is stored on the cache of the respective plurality of first caches, issue a third command such that the first portion of the data is moved from the cache of the respective plurality of first caches to the second cache, issue a fourth command that is a program resume command, and issue a fifth command such that the first portion of the data is programmed from the buffer 126 to the array of memory cells. As such, a second portion of the data that is already programmed to the array of memory cells 128 prior to the program suspend command being issued need not be reprogrammed to the array of memory cells 128. Further details associated with moving data among a plurality of caches (e.g., among SDC 427 and PDCs 429-0, . . . , 429-N−1) are described in connection with FIG. 6.

An operation performed by the system controller 118 can include moving data stored on the buffer 126 to the host 102 such that a plurality of caches (e.g., SDC 427 and/or PDCs 429) of the buffer 126 are available to the external controller (e.g., system controller 118 that is external to the memory device) as the memory resource. As an example, the system controller 118 may be further configured to issue a first command during a program suspend state such that data are moved from a cache of a plurality of first caches (e.g., PDC 429) to a second cache, and from the second cache (e.g., SDC 427) to the system controller 118 via a I/O line. In this example, the system controller 118 may be further configured to perform a read operation associated with usage of the second cache and the cache of the respective plurality of first caches, and issue a second command upon completion of the read operation such that the data are moved from the host 102 to the second cache, and from the second cache to the cache of the respective plurality of first caches. Further details associated with moving data from the buffer 126 to the host 102 are described in connection with FIG. 7.

An operation performed by the system controller 118 can also include moving data from the array of memory cells 128 to the host 102 via the buffer 126 responsive to a failure event associated with programming the data to the array of memory cells 128. For example, the host 102 can be configured to control/track data being programmed from the buffer 126 to the array of memory cells 128. As such, data programming that is interrupted by another operation (e.g., that is given a higher priority over the data programming) does not result in loss of the data.

Although the example illustrated in FIG. 1 includes a single device interface 108 serving as a bus, the memory device system 104 can include a separate data bus (DQ bus), control bus, and/or address bus. Such buses can have various types of bus structures including, but not limited to, bus structures related to Open NAND Flash Interface (ONFI), Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI). The system controller 118 can be configured to support various data interface types associated with the memory device system 104 (e.g., NV-DDR, NV-DDR2, NV-DDR3, etc.).

The system controller 118 may include, in a number of embodiments, a translation component (not shown), which can be a flash translation layer (FTL), for example, associated with logical to physical address translation between the host 102 and memory device system 104. For example, the translation component may include a mapping table of logical block addresses (LBAs) to physical block addresses (PBAs). The pages, blocks, planes, and/or associated word lines described herein also may be mapped from logical addresses to physical addresses (e.g., by the device controller 120). Although not shown in FIG. 1, device controller 120 may also include various other components implemented in hardware, firmware, and/or software and associated with management of memory device system 104.

Each of the number of memory devices 124-0, . . . , 124-N−1 may include, in a number of embodiments, the buffers 126 (e.g., 126-1, . . . , 126-N−1), and an array of memory cells 128 (e.g., 128-0, . . . , 128-N−1). In a number of embodiments, each of the buffer 126-0, . . . , 126-N−1 may be an internal buffer of a respective memory device 124-0, . . . , 124-N−1 (e.g., a buffer 126-0 is located internal to the memory device 124-0). As illustrated herein, the bus 122 (e.g., 122-0, . . . , 122-N−1) via which the device controller 120 is coupled to each of the number of memory devices 124-0, . . . , 124-N−1 can be coupled to a cache (e.g., SDC 427) of the buffer. As such, data and/or signals received from the host 102, via the device controller, may be received at the buffer 126 of the memory device 124, and then at the array of memory cells 124.

Figure 2:
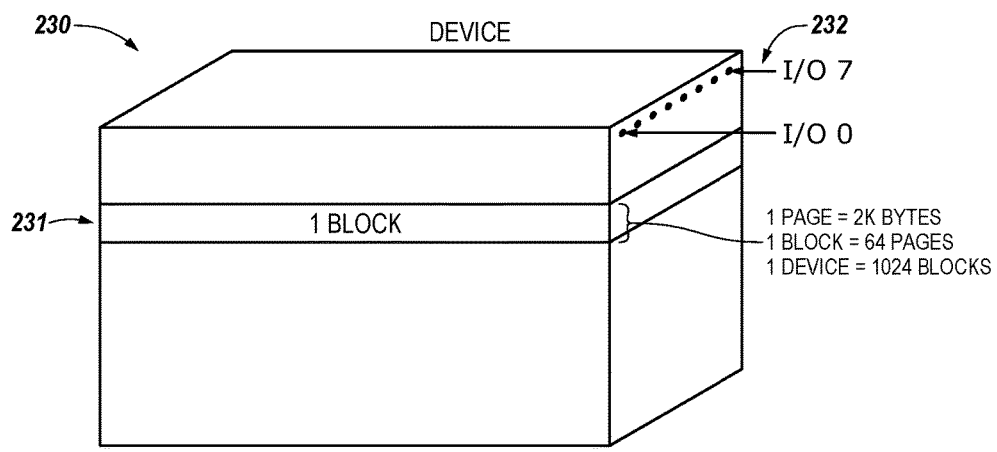
FIG. 2 is a block diagram of an apparatus in the form of a memory device configured to control memory operations on buffers in accordance with a number of embodiments of the present disclosure.
Figure 3:
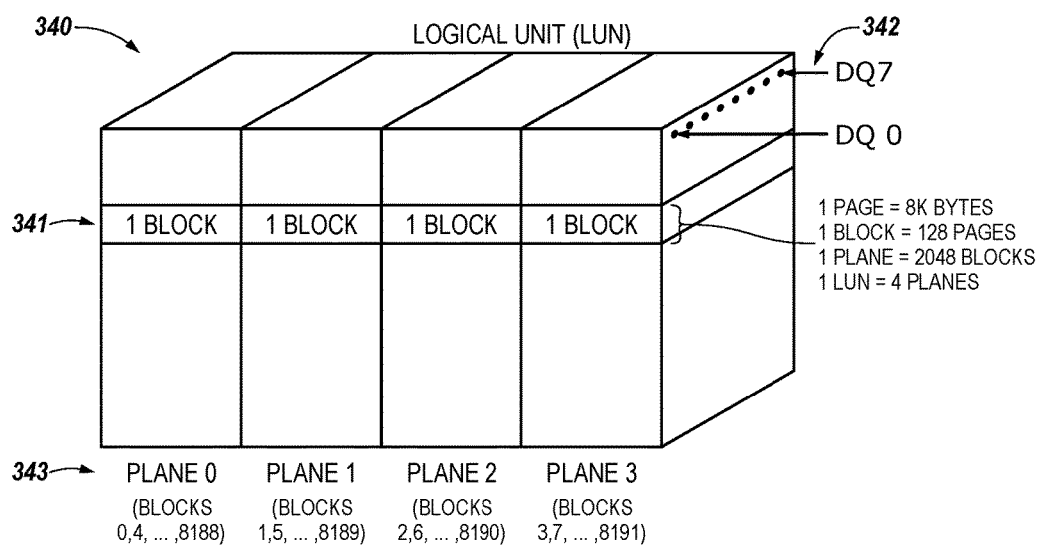
FIG. 3 is a block diagram of an apparatus in the form of a multiplane memory device configured to control memory operations on buffers in accordance with a number of embodiments of the present disclosure.

FIG. 2 is a block diagram of an apparatus in the form of a memory device 230 configured to control memory operations on buffers in accordance with a number of embodiments of the present disclosure. The memory device 230 illustrated in FIG. 2 shows an example of single unit memory device that may, in a number of embodiments, be utilized for control of memory operations on buffers, as described herein. The memory device 230 may be configured as a volatile memory resource (e.g., DRAM, among other volatile memory device configurations) or as a non-volatile memory resource (e.g., NAND, among other non-volatile memory device configurations).

As described in connection with FIG. 1, the memory device 230 illustrated in FIG. 2 can include a number of buses 232 (e.g., I/O 0, I/O 1, . . . , I/O 7) for coupling to the device controller 120 internal to the memory device system 104 including memory device 230 (e.g., for input and/or output of programming operations as directed, via the device interface 106, by the system controller 118 internal to the host 102). The memory device 230 may, in a number of embodiments, include a plurality of blocks, as described herein. As one example, a single block (e.g., 231) may include 64 pages associated with a number of word lines (not shown). In this example, eight pages each associated with a single word line, with each word line coupled to a single bus (e.g., eight buses 232 in FIG. 2), yields 64 pages for the single block 231. In a number of embodiments, each page may have a data storage capacity of 2048 (2K) bytes and the memory device 230 may have 1024 (1K) blocks; however, embodiments of the present disclosure are not limited to the configuration shown in FIG. 2.

Each word line described in connection with FIG. 2 may be coupled to a bus 232. In a number of embodiments, each bus may be coupled to one or more word lines. For example, a plurality of word lines per bus 232 may be oriented vertically (e.g., stacked) in the block 231 to form a multiple of the number of buses (e.g., eight in FIG. 2) times the number of the plurality of word lines per bus 232 as the number of word lines per block 231.

FIG. 3 is a block diagram of an apparatus in the form of a multiplane memory device 340 configured to control memory operations on buffers in accordance with a number of embodiments of the present disclosure. The multiplane memory device 340 illustrated in FIG. 3 shows an example of a four plane memory device (e.g., plane 0, plane 1, plane 2, and plane 3 as shown at 343, although embodiments may include 2, 4, 8, 16, etc., planes) that may, in a number of embodiments, be utilized for control of memory operations on buffers. A combination of the plurality of planes of the multiplane memory device 340 may be termed a logical unit (LUN). The multiplane memory device 340 may be configured as a volatile memory resource (e.g., DRAM, among other volatile memory device configurations) or as a non-volatile memory resource (e.g., NAND, among other non-volatile memory device configurations). For clarity, the multiplane memory device 340 illustrated in FIG. 3 is described below in the non-volatile NAND configuration.

In a number of embodiments, the LUN 340 may provide a storage volume for the memory device system 104 shown and described in connection with FIG. 1. The planes 343 can be dies or chips, which when combined can be referred to as the LUN 340. For example, the planes 343 can be multi-chip packages (MCPs) that each include a number of dies. The dies can be, for example, NAND dies that include a number of arrays of NAND flash memory cells and associated peripheral circuitry (e.g., write circuitry, read circuitry, I/O circuitry, buffers, etc.).

As described in connection with FIG. 1, the LUN 340 illustrated in FIG. 3 can include a number of buses 342 (e.g., data buses DQ 0, DQ 1, . . . , DQ 7) for coupling to the device controller 120 internal to the memory device system 104 (e.g., for input and/or output of programming operations as directed, via the device interface 106, by the system controller 118 internal to the host 102). Each of the memory planes 343 may, in a number of embodiments, include a plurality of blocks, as described herein. As one example, a single block (e.g., 341) in each plane may include 128 pages associated with a number of word lines (not shown). In this example, 16 pages each associated with a single word line, with each word line coupled to a single bus (e.g., eight buses 342 in FIG. 3), yields 128 pages for a single block 341 in each plane 343. In a number of embodiments, each page may have a data storage capacity of 8192 (8K) bytes and each plane 343 of the LUN 340 may have 2048 (2K) blocks. As illustrated in FIG. 3, the combination of the planes of the LUN may include 8192 (8K) blocks (4 planes times 2048 blocks per plane equals 8192 blocks); however, embodiments of the present disclosure are not limited to the configuration shown in FIG. 3.

Each word line described in connection with FIG. 3 may be coupled to a bus 342. In a number of embodiments, each bus may be coupled to one or more word lines. For example, a plurality of word lines per bus 342 may be oriented vertically (e.g., stacked) in each block 341 of each plane 343 to form a multiple of the number of buses (e.g., eight in FIG. 3) times the number of the plurality of word lines per bus 342 as the number of word lines per block 341.

In the example shown in FIG. 3, each block , 1, . . . , 8191 formed from a block from each of planes 0, 1, 2, and 3 includes memory cells which can be erased together as a unit (e.g., the cells in each physical block can be erased in a substantially simultaneous manner as an erase unit). Each block may include a number of physical rows of memory cells that can each be coupled to a respective word line (e.g., access line). The number of rows in each block can be 32, 64, or 128, but embodiments are not limited to a particular number of rows, which can be referred to collectively as rows per block.

As one of ordinary skill in the art will appreciate, each row coupled to a word line can include a number of physical pages of cells. A physical page of cells can refer to a number of memory cells that may be programmed and/or written together or as a functional group. For example, each row can include multiple physical pages of cells (e.g., an even page associated with cells coupled to even-numbered bit lines, and an odd page associated with cells coupled to odd numbered bit lines). Additionally, for embodiments including multilevel cells, a physical page can store multiple logical pages of data with each cell in a physical page contributing a bit toward a logical lower page, a bit toward a logical upper page, and one or more bits toward a respective number of logical intermediate pages.

The NAND memory devices described as example memory resources for the memory device 230 illustrated in FIG. 2 and/or the LUN 340 illustrated in FIG. 3 may, in a number of embodiments, include NAND dies (e.g., NAND flash arrays) that have single level cells (SLCs) configured to store a single data unit (e.g., one bit), and/or multilevel cells (MLCs) configured to store more than one data unit. Additionally, the cells can be programmable via various different programming processes, which can depend on the quantity of data units stored per cell; however, cells configured to store a particular quantity of data units (e.g., 2 bits, 3 bits, 4 bits, etc.) per cell can be programmable via different programming processes. For example, a 3-bit MLC might be programmable via a two-pass programming process (e.g., a 4-8 process in which a first programming pass places the threshold voltage of the cells from an erase state into one of four distributions based on a lower page and middle page data state and in which a second programming pass places the threshold voltage of the cells from the one of four distributions into one of eight distributions based on the upper page data state), or a three-pass programming process (e.g., a 2-4-8 process).

Embodiments of the present disclosure are not limited to the example shown in FIG. 3. For example, memory systems in accordance with embodiments of the present disclosure can include more or fewer than four planes 343 per LUN 340 and are not limited to a particular memory array architecture (e.g., NAND, NOR, DRAM, PCM, etc.). In addition, although one device controller 120 is shown per memory device system in FIG. 1, embodiments may include a device controller 120 per memory device 230 in FIG. 2 and/or a device controller 120 per LUN 340 or plane 343 thereof in FIG. 3 (e.g., one controller per NAND die).

The memory devices 124 in the memory device system 104 coupled to the internal SSD device controller can, in a number of embodiments, be a number of SSDs configured as a non-volatile memory resource (e.g., NAND), although embodiments are not so limited. In a number of embodiments, the memory devices 124, 230, and/or 340 are configured to perform a memory operation on data in the buffer 126 responsive to receipt of a command from the host 102. Performing the memory operation on the data in the buffer 126 responsive to receipt of the command from the host 102 can provide benefits such as using a plurality of caches of the buffer 126 as a memory resource, as described further in connection with FIGS. 6 and 7.

As one example, the memory device 124 may, responsive to receipt of a command from the host, be configured to move data from the buffer 126 to the host 102 while in a program suspend state such that the second cache (e.g., SDC 427) of the buffer and a cache of the plurality of first caches (e.g., PDC 429) are available as a memory resource to the host 102, perform a read operation associated with usage of the second cache of the buffer and the cache of the plurality of first caches while the data is stored on the host 102, and move the data from the host to the buffer 126 upon completion of the read operation.

Figure 4:
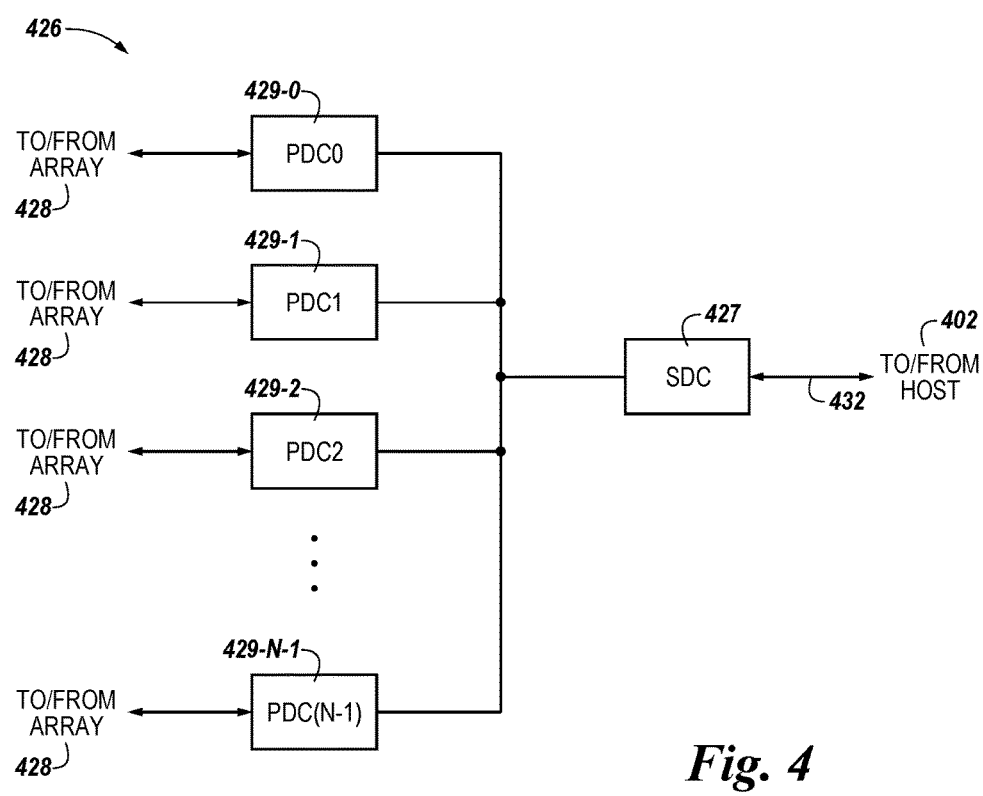
FIG. 4 is a block diagram of an apparatus in the form of a buffer associated with controlling memory operations on buffers in accordance with a number of embodiments of the present disclosure.

FIG. 4 is a block diagram of an apparatus in the form of a buffer 426 associated with controlling memory operations on buffers in accordance with a number of embodiments of the present disclosure. As shown at and described in connection with FIG. 1, the buffer 426 is located internal to the memory device 124, and is coupled to the device controller 120 via a bus 122 (e.g., I/O 232 or DQ 342 as described in connection with FIGS. 2 and 3).

As shown in FIG. 4, the buffer 426 may include a plurality of caches including a plurality of primary data caches (e.g., PDCs 429), and a secondary data cache (e.g., SDC 427). The SDC 427 may be coupled to the system controller 118 via an I/O line 432. In a number of embodiments, the SDC 427 may, via the I/O 432 (e.g., bus 122 as described in FIG. 1), be coupled to the device controller 120, which is then coupled to the host 102, although embodiments are not so limited. As such, the buffer 426 may receive data and/or commands from the host 102 at the SDC prior to receiving at the plurality of PDCs 429-0, . . . , 429-N−1. The plurality of PDCs are coupled to the SDC 427 and to the array of memory cells 428 (e.g., 128-0, . . . , 128-N−1). As such, data received at the buffer 426 may be stored in the plurality of PDCs 429 prior to being programmed to the array of memory cells 428.

Although a single SDC 427 is shown in FIG. 4, embodiments are not so limited. For example, the buffer 426 may include a plurality of SDCs 427, in which each of the plurality of SDCs 427 is coupled to the host 402 via an I/O line 432 and to a set of the plurality of PDCs 429 (e.g., 429-0, 429-1, 429-2, . . . , 429-N−1). As such, in this example, the buffer 426 may receive data and/or signals from the host 402 via a plurality of I/O lines 432 each coupled to a respective SDC 427.

In a number of embodiments, the host 402, via the system controller 118, may be configured to control performance of various memory operations on a plurality of caches (e.g., SDC 427 and/or PDCs 429). For example, the memory operations may include resetting the plurality of caches of the buffer, moving data among the plurality of caches of the buffer, and/or swapping data stored on a first cache of the plurality of caches with other data stored on a second cache of the plurality of caches.

In a number of embodiments, the system controller 118 may be further configured to perform a compute operation on data in the plurality of caches (e.g., SDC 427 and/or PDCs 429). For example, the system controller 118 may issue commands to the memory device 124 to direct data movement from the plurality of caches. The data may be moved to a particular compute component that may be used in performing a compute operation, and a result of the compute operation may be stored and/or moved to a different place (e.g., the buffer 126, the array of memory cells 128, and/or the host 102).

FIG. 5 illustrates a table illustrating an example of a set features interface 519 maintained internal to a host 102 in accordance with a number of embodiments of the present disclosure. As shown at 119 and described in connection with FIG. 1, the set features interface 519 internal to the host 102 may be associated with (e.g., formed as part of) the system controller 118.

In a number of embodiments, the table of the set features interface 519 shown in FIG. 5 may include a number of features 561, with a number of the features having a plurality of options 552. The features 561 and/or options 552 in the set features interface 519 may be selectably enabled (e.g., applied) via input of commands. The commands may, in various embodiments, be input from processor 105, memory and bus control 107, peripheral and bus control 109, host memory 116, system controller 118, and/or a user (not shown), among other possibilities.

An example of a feature 561 in the set features interface 519 can be direction to a selection of page buffer operations 563 that may be performed on a buffer (e.g., buffers 126). For example, the page buffer operations 563 may include a copy operation 554-1, a reset operation 554-2, and a swap operation 554-3 that may be selectably enabled (e.g., directed) to, in a number of embodiments, particular I/O lines 232 and/or data buses 342 (e.g., DQ 0, DQ 1, . . . , DQ 7 shown at 542).

For example, the copy operation 554-1 may be enabled concerning data buses DQ 6 and DQ 7. Enabling the copy operation 554-1 may be achieved by entry of a 0 data value for data buses DQ 6 and DQ 7 in the set features interface 519. The reset operation 554-2 is another option 552 that may be enabled. For example, the reset operation 554-2 may be enabled, for example, by entry of a 1 data value for DQ 7 and entry of a 0 data value for DQ 6. The swap operation 554-3 is another option 552 that may be enabled. For example, the swap operation may be enabled by entry of a 1 data value for DQ 6 and entry of a 0 data value for DQ 7.

Another example of a feature 561 in the set features interface 519 can be direction to a plane selection 565. For example, selecting a particular plane may be selectably enabled (e.g., directed) to, in a number of embodiments, particular DQs (e.g., DQ 0, DQ 1, . . . , DQ 7 shown at 542). For example, an option 556-1 may be enabled to select a PLANE 0 (e.g., a particular plane that is assigned to a data bus DQ 7) by entry of a 1 data value for DQ 7. In another example, an option 556-2 may be enabled to select PLANE 0 and PLANE 1 (e.g., PLANE 1 is assigned to a data bus DQ 6) by entry of a 1 data value for DQ 6 and DQ 7. As such, a plurality of PLANEs (e.g., PLANE 0 and PLANE 1) may be selected simultaneously by entry of a corresponding data value (e.g., a data value of 1) for multiple data buses 542. For example, an option 556-3 may be enabled to select all PLANEs by entry of a 1 data value for all data buses that are assigned to a respective plane (e.g., by entry of a 1 data value for DQ 4, DQ 5, DQ 6, and DQ 7 when there are four planes).

Another example of a feature 561 in the set features interface 519 can be direction to a buffer selection 567 (e.g., a single cache). For example, selecting a particular cache may be selectably enabled (e.g., directed) to, in a number of embodiments, particular DQs (e.g., DQ 0, DQ 1, . . . , DQ 7 shown at 542). For example, an option 558-1 may be enabled to select the SDC 427 by entry of a 1 data value for DQ 7. In another example, an option 558-2 may be enabled to select the PDC 0 (e.g., 429-0) by entry of a 1 data value for DQ 6. Similarly, an option 558-3, 558-4, and 558-3 can be selectably enabled to select the PDC 1 (e.g., 427-1), PDC 2 (e.g., 427-2), and PDC 3 (e.g., 427-3), respectively. For example, PDC 1 (e.g., 427-1), PDC 2 (e.g., 427-2), and PDC 3 (e.g., 427-3) can be selected by entry of a 1 data value for DQ 3, DQ 4, and DQ 5, respectively.

Another example of a feature 561 in the set features interface 519 can be direction to a buffer selection 569 (e.g., multiple caches simultaneously). For example, selecting a particular cache may be selectably enabled (e.g., directed) to, in a number of embodiments, particular DQs (e.g., DQ 0, DQ 1, . . . , DQ 7 shown at 542). For example, an option 560-1 may be enabled to select the SDC 427, PDC 1 (e.g., 429-1), and PDC 3 (e.g., 429-3) by entry of a 1 data value for DQ 3, DQ 5, and DQ 7. In another example, an option 560-2 may be enabled to select the PDC 2 (e.g., 429-2) and PDC 3 (e.g., 429-3) by entry of a 1 data value for DQ 3 and DQ 4.

Other features 561 and/or options 552 may be available in the set features interface 519. In addition, more than one set features interface 519 may be maintained for a computing system 100. For example, in a number of embodiments, a plurality of set features interfaces 519 may be maintained when the memory device system 104 includes a plurality of memory devices 124 that can include volatile memory resources and/or non-volatile memory resources.

Figure 6:
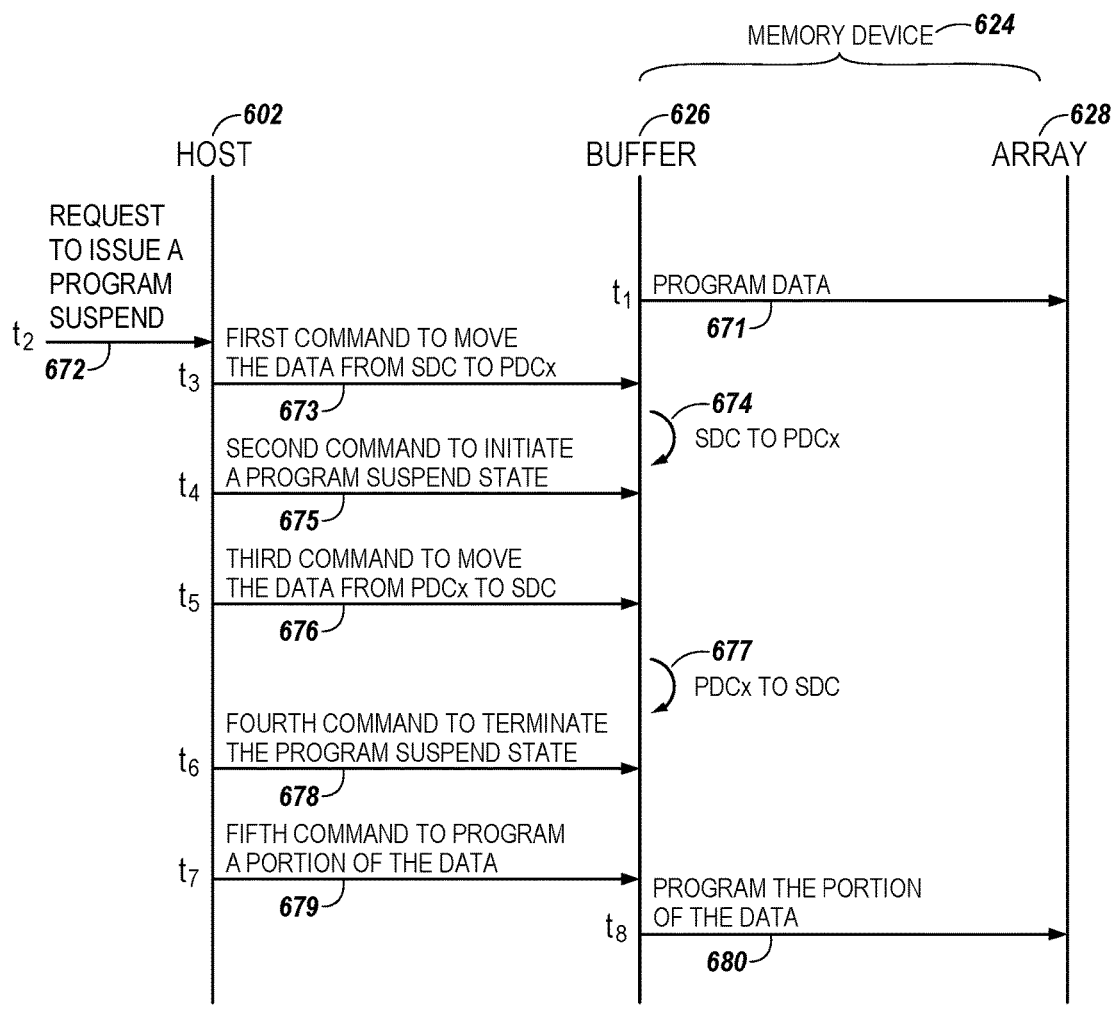
FIG. 6 illustrates a timing diagram associated with controlling memory operations on buffers in accordance with a number of embodiments of the present disclosure.

FIG. 6 illustrates a timing diagram associated with controlling memory operations on buffers 626 in accordance with a number of embodiments of the present disclosure. In this example, at a time $t_1$, the memory device is configured to initiate programming data (e.g., received from the host 602) from the buffer 626 to the array of memory cells 628 (e.g., as indicated by arrow 671). In a number of embodiments, programming the data can include two-pass or three-pass programming as described in connection with FIG. 3. At a time $t_2$, a host 602 receives a request to issue a program suspend command while the data is being programmed (e.g., initiated at the time $t_1$). As an example, arrow 672 represents the request to issue the program suspend command. At a time $t_3$, the host 602 (e.g., via the system controller 118) issues a first command to the memory device 624 (as indicated by arrow 673) such that a portion of the data that is not programmed to the array of memory cells 628 is moved (e.g., from SDC 427 to PDCx 429).

As indicated by arrow 674, the memory device 624 is configured to move a first portion of the data that is not programmed to the array of memory cells 628 from the second cache of the buffer 626 to a cache of the plurality of first caches responsive to receipt of the first command from the host 602. For example, the first portion of the data that is not programmed to the array of memory cells 628 can be moved to and stored in one of the PDCs 429 (e.g., PDCx) that are coupled to the SDC 427 of the buffer 626. As a result, the SDC 427 is available to the host 602 as a memory resource. Accordingly, at a time $t_4$, the host 602 may issue a second command (e.g., the program suspend command) to initiate the program suspend state and perform an operation associated with the program suspend state (e.g., as indicated by arrow 675) by using the SDC 427 and the portion of the PDCs 429 that are available to the host 602 as the memory resource.

At a time $t_5$, a third command can be issued from the host 602 upon completion of the operation associated with the program suspend state (as indicated by arrow 676) such that the first portion of the data is moved back to where it was originally stored. As indicated by arrow 677, the memory device 624 can be configured to move the first portion of the data from the cache of the plurality of first caches to the second cache of the buffer responsive to receipt of the third command from the host 602. For example, the first portion of the data that is stored in the one of the PDCs 429 (e.g., PDCx) can be moved back to the SDC 427, where the first portion of the data was originally stored at the time $t_1$. At a time $t_6$, the host 602 may issue a fourth command (e.g., a program resume command) responsive to moving the first portion of the data back to the SDC 427 (e.g., as indicated by arrow 678). For example, responsive to issuance of the fourth command (e.g., program resume command), the computing system 100 may terminate the program suspend state and enter into another state (e.g., a state prior to entering the program suspend state). At a time $t_8$, the memory device is further configured to program the first portion of the data from the buffer 624 to the array of memory cells 628 (e.g., as indicated by arrow 680) responsive to receipt of a fifth command (e.g., as indicated by arrow 679) from the host 602 at a time $t_7$.

A second portion of the data that is, prior to the program suspend command being issued, already programmed to the array of memory cells is not reprogrammed to the array of memory cells. For example, consider a host that is not able to track/control a memory operation being performed in an internal buffer of a memory device. As the host is not able to track how complete the programming (e.g., two-pass or three-pass programming as described in connection with FIG. 3) is, the host may need to resend the data to the memory device (e.g., when programming the data to the array of memory cells is interrupted by another operation) such that the entire data can be rewritten from the buffer to the array of memory cells.

In contrast, the host 602, in a number of embodiments, has a capability to track/control the memory operation (e.g., tracking/controlling data being programmed from the buffer 626 to the array of memory cells 628). As such, even when programming data from the buffer 626 to the array of memory cells 628 is interrupted by another operation that is given a higher priority (e.g., the operation associated with the program suspend command), the entire data need not be resent from the host 602. Instead, the host 602 is configured to issue commands to the memory device 624 such that the memory device 624 is configured to store the first portion of the data (e.g., that is not yet programmed to the array of memory cells 628) in one of the PDCs 429, and reinitiate programming the first portion of the data to the array of memory cells 628 without reprogramming the second portion of the data that is already programmed to the array of memory cells 628. Accordingly, latency associated with programming data from the buffer 626 to the array of memory cells 628 may be reduced.

Figure 7:
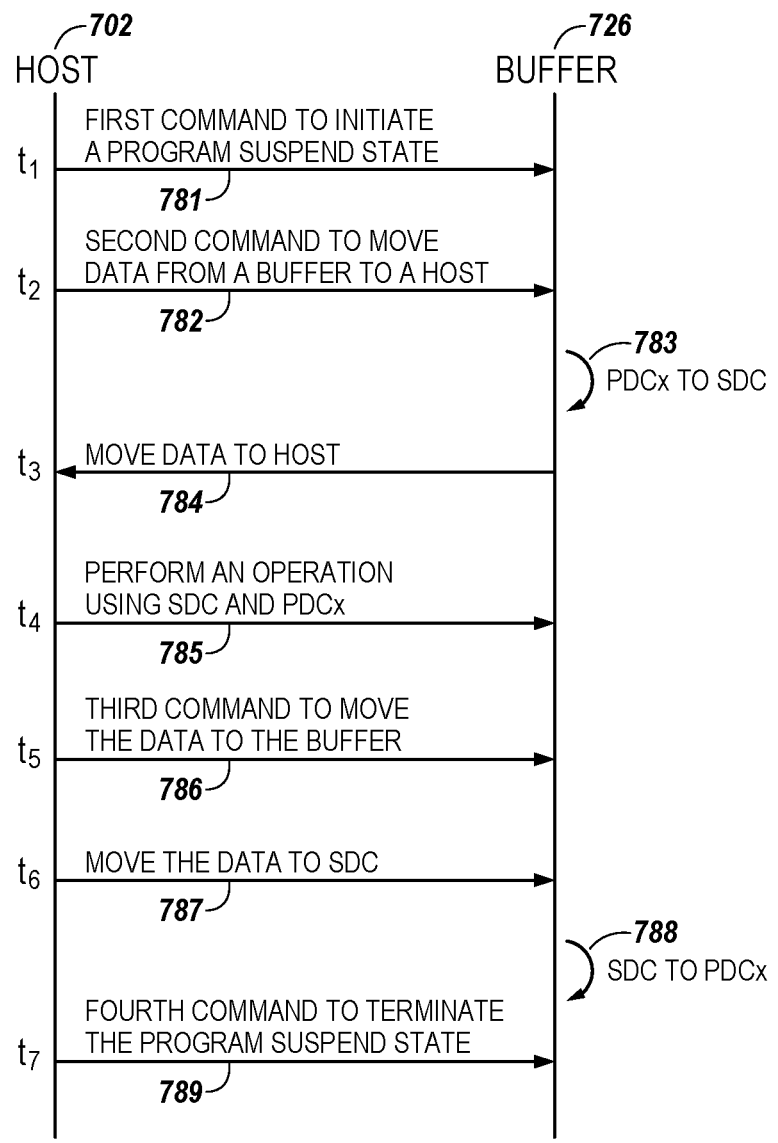
FIG. 7 illustrates a timing diagram associated with controlling memory operations on buffers in accordance with a number of embodiments of the present disclosure.

FIG. 7 illustrates a timing diagram associated with controlling memory operations on buffers 726 in accordance with a number of embodiments of the present disclosure. In this example, at a time $t_1$, a host 702 issues a first command (e.g., program suspend command) to initiate a program suspend state (e.g., as indicated by arrow 781). At a time $t_2$, the host 702 issues a second command (e.g., as indicated by arrow 782) during the program suspend state (e.g., state entered by the first command) to move data stored in the buffer 726 to the host 702. In a number of embodiments, the second command can be a set feature command. For example, the second command can be a copy command 554-1 that moves data stored in one place to another place.

Responsive to receipt of the second command, the memory device 124 may be configured to move data (e.g., stored in a buffer 726) from the buffer 726 to the host 702 (e.g., as indicated by arrow 782). For example, the memory device is configured to move the data stored in one of the PDCs 429 (e.g., PDCx) to the SDC 427 (e.g., as indicated by arrow 783), and from the SDC 427 to the host 702 at a time $t_3$ (e.g., as indicated by arrow 784). As a result, at least two caches of the buffer 726 are available to the host 702 as a memory resource. As such, at a time $t_4$, the operation using at least two caches (e.g., SDC 427 and one of the PDCs 429) can be performed (e.g., as indicated by arrow 785) while the data previously stored in the two caches of the buffer 726 are stored in the host 702 (e.g., the host memory 116). The operation associated with using two caches of the buffer 726 can include a soft-bit read operation, corrected read operation, cache read operation, and/or channel calibration that are associated with adjusting sensing voltages and/or read reference voltages for use in hard and/or soft data reads, for example. In a number of embodiments, soft data can, for example, indicate the quality and/or confidence of the hard data (e.g., information regarding the probability of the cell storing the hard data or of the cell storing different data). Accordingly, soft data can provide benefits such as increased accuracy and/or reliability (e.g., decreased error rate), and/or increased memory life, among other benefits.

At a time $t_5$, the host 702 may issue a third command (e.g., as indicated by arrow 786) to the memory device 624 (e.g., buffer 726) upon completion of the operation associated with using the SDC 427 and one of the PDCs 429 (e.g., PDCx). The third command can be a set feature command. For example, the third command can be a copy command 554-1 that moves data from one place (e.g., host 702) to another place (e.g., buffer 726). At a time $t_6$, the memory device 624 is configured to move the data from the host 702 to the buffer 726 (e.g., responsive to receipt of the third command from the host 702), where the data were originally stored prior to being moved to the host 702 (e.g., as indicated by arrow 787). For example, the data that are stored in the host 702 (e.g., while the operation associated with using the SDC 427 and PDCx 429 is being performed) can be moved from the host 702 to the SDC 427 (e.g., as indicated by arrow 788), and from the SDC 427 to the PDCx 429 (e.g., as indicated by arrow 788), where the data were originally stored prior to being moved to the host 702. At a time $t_7$, the host 702 may issue a fourth command (e.g., program resume command) to terminate the program suspend state (e.g., as indicated by arrow 789) responsive to moving the data to the PDCx 429.

Embodiments described in connection with FIG. 7 provide benefits such as improving the reliability of the memory device via a host-initiated command. For example, consider data (e.g., including an amount of user data and an amount of inhibit data that indicates when to terminate two-pass or three pass programming) that remain in a plurality of caches (e.g., SDC 427 and PDCs 429) even subsequent to being programmed to the array of memory cells 128. Issuance of a program suspend command (e.g., thereby entering a program suspend state) may prevent a host and/or memory device from moving the remaining data from the plurality of caches to other places (e.g., host and/or an array of memory cells). As such, an operation associated with using at least two caches (e.g., other than a normal read operation that need not employ two caches) may not be performed as long as the remaining data are stored in the plurality of caches.

In contrast, the host 702, in a number of embodiments, can be configured to move the remaining data from the plurality of caches (e.g., SDC 427 and PDCs 429) to other places, such as the host memory 116. Therefore, the plurality of caches (e.g., SDC 427 and PDCs 429) are available to the host 702 as a memory resource, and the host 702 can be configured to perform an operation associated with using two caches. As such, embodiments provide benefits, such as improving the reliability of the memory device via the host-initiated command.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device including a buffer and an array of memory cells, wherein the buffer includes a plurality of caches; and
   a host including a system controller, the system controller configured to control performance of a memory operation on data in the buffer, wherein the memory operation is associated with data movement among the plurality of caches, the system controller further configured to:
      receive a request to issue a program suspend command associated with usage of a second cache while data are being programmed from the buffer to the array of memory cells;
      issue a first command such that a first portion of the data is moved from the second cache to a cache of a plurality of first caches, wherein the first portion of the data is an amount of bits that are not programmed to the array of memory cells during the data being programmed to the array of memory cells; and
      issue a second command that is the program suspend command such that an operation associated with the program suspend command is performed on the second cache while the first portion of the data is stored on the cache of the respective plurality of first caches.

2. The apparatus of claim 1, wherein the plurality of caches comprise: a plurality of first caches coupled to a second cache; and the second cache coupled to the host via an input/output (I/O) line.

3. The apparatus of claim 1, wherein the system controller is further configured to:
   issue a third command such that the first portion of the data is moved from the cache of the respective plurality of first caches to the second cache;
   issue a fourth command that is a program resume command; and
   issue a fifth command such that the first portion of the data is programmed from the buffer to the array of memory cells.

4. The apparatus of claim 1, wherein a second portion of the data that is already programmed to the array of memory cells prior to the program suspend command being issued is not reprogrammed to the array of memory cells.

5. The apparatus of claim 1, wherein the system controller comprises a set features interface configured to issue a plurality of set feature commands to the memory device.

6. The apparatus of claim 1, wherein the system controller is further configured to perform a compute operation on data in the plurality of caches.

7. An apparatus, comprising:
   a host configured to issue commands, wherein the host:
      receives a request to issue a program suspend command while data is being programmed from the buffer to the array of memory cells;
      issues a first command and a second command to the memory device responsive to the receipt of the request; and
   a memory device including a buffer and an array of memory cells; and wherein:
      the memory device is configured to perform a memory operation on data in the buffer responsive to receipt of a command from the host;
      the buffer includes a plurality of first caches coupled to a second cache and the second cache coupled to the host via an input/output (I/O) line; and wherein the memory device is further configured to:
         move a first portion of the data that is not programmed to the array of memory cells from the second cache of the buffer to a cache of the plurality of first caches responsive to receipt of the first command from the host and
         move the first portion of the data from the cache of the plurality of first caches to the second cache of the buffer responsive to receipt of the second command that is issued from the host upon completion of an operation associated with the program suspend state.

8. The apparatus of claim 7, wherein the memory operation is performed on the data in the buffer during a program suspend state such that the plurality of first caches and the second cache of the buffer are available as a memory resource to the host.

9. The apparatus of claim 7, wherein an operation associated with the program suspend state is performed on the second cache of the buffer while the first portion of the data is stored in the cache of the plurality of first caches.

10. The apparatus of claim 7, wherein:
    the memory device is further configured to program the first portion of the data from the buffer to the array of memory cells responsive to receipt of a third command that is issued from the host upon completion of the program suspend state; and
    a second portion of the data that is, prior to the program suspend command being issued, already programmed to the array of memory cells is not reprogrammed to the array of memory cells.

11. The apparatus of claim 7, wherein the memory device is a NAND Flash memory.

12. The apparatus of claim 7, wherein the buffer is an internal buffer of the memory device.

13. A method, comprising:
    receiving, from an external controller, a command to a memory device comprising an array of memory cells and a buffer, wherein the received command is a program suspend command and is associated with usage of a second cache while data are being programmed from the buffer to the array of memory cells;
    issue a first command such that a first portion of the data is moved from the second cache to a cache of a plurality of first caches, wherein the first portion of the data is an amount of bits that are not programmed to the array of memory cells during the data being programmed to the array of memory cells;
    issue a second command that is the program suspend command such that an operation associated with the program suspend command is performed on the second cache while the first portion of the data is stored on the cache of the respective plurality of first caches; and responsive to receiving the command from the external controller, performing a memory operation on data in the buffer such that the buffer is available as a memory resource to the external controller;

wherein the external controller is located internal to a host such that the host is further configured to control performing the memory operation on the data in the buffer.

14. The method of claim 13, further comprising:
moving data stored on the buffer to the host such that a plurality of caches of the buffer is available to the external controller as the memory resource.

15. The method of claim 13, further comprising:
moving data stored on a second cache of the buffer to a first cache of the respective buffer such that the second cache of the buffer is available to the external controller as the memory resource.

16. The method of claim 13, wherein the memory operation further comprises an operation selected from:
resetting a plurality of caches of the buffer;
moving data among the plurality of caches of the buffer; and
swapping data stored on a first cache of the plurality of caches with other data stored on a second cache of the plurality of caches.

17. The method of claim 13, wherein the host is further configured to, via the external controller, control performing the memory operation on the data in the buffer independently respective to an internal controller of the memory device.

18. The method of claim 13, further comprising:
receiving a request to perform an operation associated with using a second cache of the buffer while programming data from the buffer to the array of memory cells;
storing a first portion of the data that is not programmed to the array of memory cells on a first cache of the buffer while performing the operation associated with using the second cache of the buffer; and
responsive to completing the operation, programming the portion of the data to the array of memory cells without reprogramming a second portion of the data that is already programmed to the array of memory cells.

19. The method of claim 13, further comprising:
programming data from the buffer to the array of memory cells; and
moving the data from the array of memory cells to the host via the buffer responsive to a failure event associated with programming the data to the array of memory cells.

20. An apparatus, comprising:
a memory device including a buffer and an array of memory cells, wherein the buffer includes a plurality of caches; and a host including a system controller, the system controller configured to control performance of a memory operation on data in the buffer, wherein the memory operation is associated with data movement among the plurality of caches, the system controller further configured to:
issue a first command that is a program suspend command to initiate a program suspend state;
issue a second command during the program suspend state such that data is moved from a cache of a plurality of first caches to a second cache, and from the second cache to the system controller via a I/O line;
perform a read operation associated with usage of the second cache and the cache of the respective plurality of first caches; and
issue a third command upon completion of the read operation such that the data are moved from the host to the second cache and from the second cache to the cache of the respective plurality of first caches.

21. The apparatus of claim 20, wherein the system controller is further configured to move the data from the second cache to the cache of the respective plurality of first caches upon the completion of the read operation.

22. An apparatus, comprising:
a host configured to issue commands; and
a memory device including a buffer and an array of memory cells; and wherein:
the memory device is configured to perform a memory operation on data in the buffer responsive to receipt of a command from the host;
the buffer includes a plurality of first caches coupled to a second cache and the second cache coupled to the host via an input/output (I/O) line, and wherein, responsive to receipt of the command from the host, the memory device is further configured to:
move data from the buffer to the host while in a program suspend state such that the second cache of the buffer and a cache of the plurality of first caches are available as a memory resource to the host;
perform a read operation associated with usage of the second cache of the buffer and the cache of the plurality of first caches while the data is stored on the host; and
move the data from the host to the buffer upon completion of the read operation.

23. The apparatus of claim 22, wherein the read operation comprises an operation selected from:
a soft-bit read operation
a corrected read operation;
a cache read operation; and
a channel calibration.

* * * * *